Sept. 17, 1946.    E. W. NORTH ET AL    2,407,763
FURNITURE HANDLE
Filed April 10, 1944
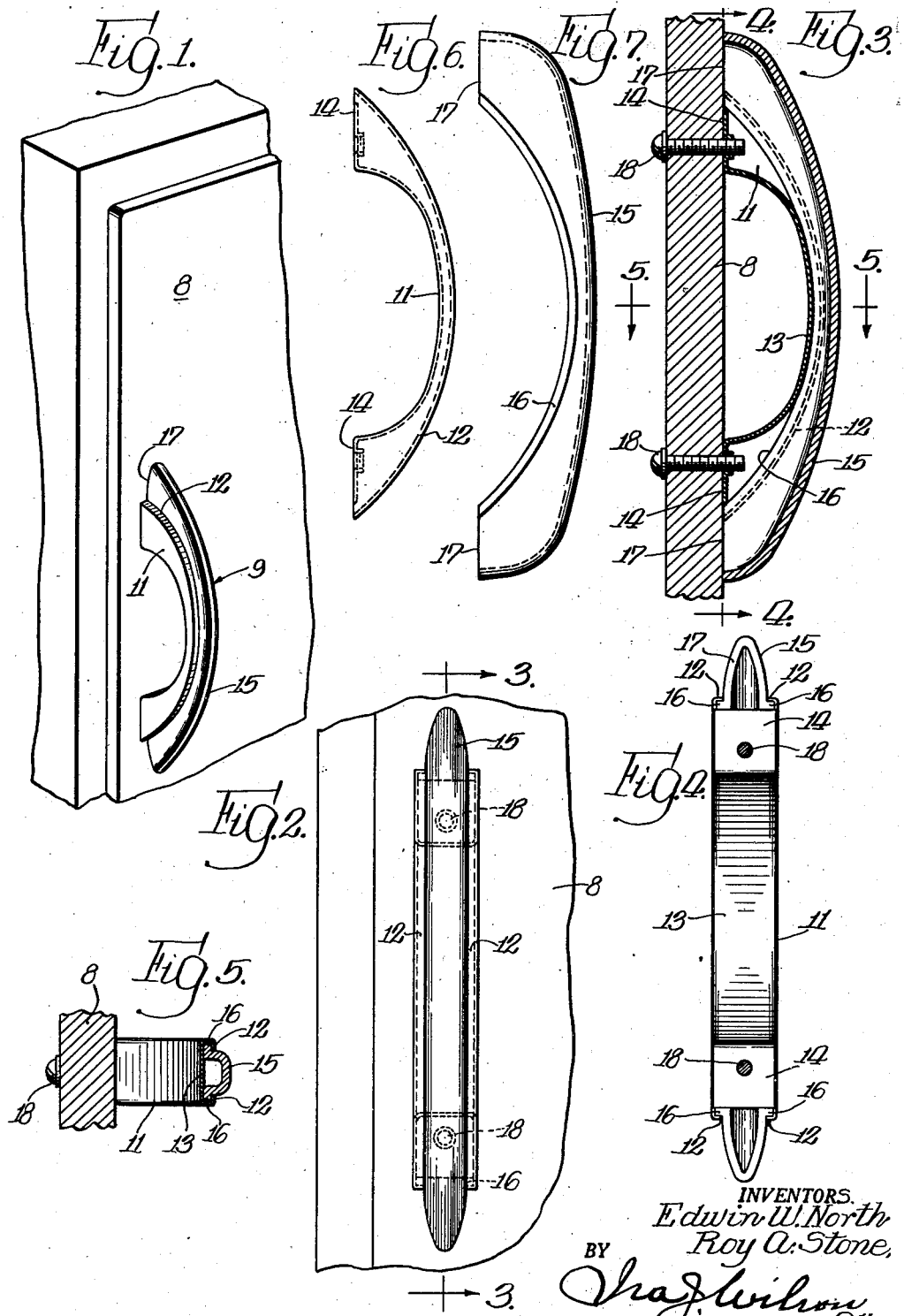
INVENTORS.
Edwin W. North
Roy A. Stone,
BY
Cha J. Wilson
Atty.

Patented Sept. 17, 1946

2,407,763

UNITED STATES PATENT OFFICE 2,407,763

FURNITURE HANDLE

Edwin W. North and Roy A. Stone, Rockford, Ill., assignors to National Lock Co., Rockford, Ill., a corporation of Delaware Application April 10, 1944, Serial No. 530,270

3 Claims. (Cl. 16—125)

This invention pertains to handles adapted for use on furniture, such as door handles, drawer pulls and the like. Handles constructed in accordance with our invention may be made in various sizes and designs in conformity with the use to which they are to be put. For illustrative purposes merely, we have here shown a handle adapted for use upon a kitchen cabinet.

Among the purposes of our invention is the provision of a handle which will be strong and durable, one which will be large enough so that it may be readily grasped by the user, one which can be economically manufactured, readily assembled and easily attached to the cabinet or other article of furniture, and one which will possess ornamental and decorative qualities as well as satisfactorily serving its utilitarian purposes.

To facilitate an understanding of my invention, I have shown on the accompanying drawing a preferred embodiment thereof, referring to which, Fig. 1 is a fragmentary perspective view of a cabinet door with our novel handle mounted thereon;

Fig. 2 is an elevation of the handle shown in Fig. 1;

Fig. 3 is a longitudinal sectional view on the line 3—3 of Fig. 2;

Fig. 4 is a rear view of the handle taken on the line 4—4 of Fig. 3;

Fig. 5 is a transverse sectional view on the line 5—5 of Fig. 3;

Fig. 6 is a side elevation of the metal body; and

Fig. 7 is a similar view of a slightly different design of ornamental plastic fillet.

On the drawing a door upon which our improved handle is illustrated as being mounted is indicated by reference character 8 and the handle by reference character 9.

The handle comprises two structurally separate portions, to wit, the body 11 and the fillet 15. The body, which is preferably formed of sheet metal of suitably heavy gauge, is generally channel-shape in cross-section and is bowed outwardly between its ends to permit the fingers of the user to be inserted between the outwardly spaced portion of the handle and the door 8 so that the handle may be grasped to exert an outward pull on the door.

The outer edges of the channel walls are turned inwardly to form the opposed flanges 12 for a purpose which will be later described, said flanges extending from end to end of the body upon the arc of a circle. The base or bottom wall 13 of the channel, while curved, as will be evident from Figs. 3 and 6, is not formed on the arc of a circle but recedes rapidly from the flanges 12 near the ends of the base, thereby providing a flat portion 14 of substantial length at each end of the body to which the fastening screws or bolts 18 extending through the door 8 may be threaded to mount and secure the body on the door.

The fillet 15, which is of generally arcuate shape, is formed of suitable plastic material, preferably attractively colored, so that the fillet serves the dual purpose of providing bulk for the handle to be grasped and affording adornment for the metal body. The fillet is formed along its inner margins to provide a pair of outwardly extending flanges 16 shaped and proportioned to be received beneath the flanges 12 of the body whereby the fillet and body are interlocked to hold the fillet in place. While the fillet may be solid, it is illustrated in the drawing as being hollow, thereby minimizing the amount of material required. Instead of being colored, the fillet may be made of clear transparent or translucent plastic, in which event the back may be painted to conceal the underlying fastening means. The fillet shown in Fig. 7 is of slightly different contour and design than is shown in Figs. 1 to 5, inclusive.

It will be observed that the inner face and ribs or flanges 16 of the fillet are formed on an arc having the same radius as the flanges 12 of the body, so that, when the body and fillet are placed end to end with the flanges 16 of the fillet engaged beneath the ends of the flanges 12 of the body, relative longitudinal movement of the body and fillet will cause the same to assume their assembled position illustrated in Figs. 1 and 3 in which they are firmly interlocked together. The ends 17 of the fillet engage the outer face of the door 8 beyond the ends 14 of the body, and when the body is anchored to the door by the screws 18 the fillet is thereby locked against longitudinal movement on the body and accordingly becomes a fixed part of the handle.

It will be apparent from the foregoing that we have provided a handle of substantial construction and pleasing appearance, comprising a metal body adapted to be attached to a door or the like and an ornamental plastic fillet adapted to be assembled with and connected to the body by simple longitudinal movement of one with respect to the other which establishes an interlocking engagement between cooperating flanges formed on the body and the fillet, respectively. Both the body and the fillet may be shaped to suit the taste of the designer or user, it only being necessary that the curved interior of the body and fillet, respectively, be formed on arcs of equal radii so that they may be locked together by relative longitudinal movement. Considerable variation of the structure illustrated may be resorted to within the scope of the appended claims.

We claim:

1. A handle, comprising a channel-shaped outwardly bowed metal body having flat co-planar end walls for the reception of fastening means and in-turned opposed flanges extending along the outer margins of the channel walls, and an outwardly bowed fillet having an inner face conforming to the curvature of the outer face of the body and laterally projecting flanges adapted for sliding inter-engagement with said flanges of the body to secure said fillet and body together.

2. A handle, comprising a channel-shaped metal body provided with flanges extending longitudinally of the body and formed on the arc of a circle, a fillet of plastic material provided adjacent its inner face with arcuate flanges formed on an arc of the same radius as the body flanges, the flanges of the body and fillet being interlocked to mount the fillet on the body, the channel of the body being of increased depth toward the ends of the body to provide a space between the fillet and the base of the channel at the ends thereof for the accommodation of fastening means whereby the handle is mounted.

3. A furniture handle, comprising a body member having a convex outer face and a fillet member having a concave inner face, said members being provided on said faces respectively with opposed arcuate flanges formed on arcs of substantially equal radii and adapted to be inter-engaged to lock the members together by relative longitudinal movement of said members, the ends of the body and fillet members being disposed in a common plane when the members are assembled and adapted to engage a flat face of a piece of furniture upon which the handle is mounted whereby relative longitudinal movement between the members is prevented, one of said members having co-planar end walls for the reception of fastening means whereby said handle is mounted.

EDWIN W. NORTH.
ROY A. STONE.